US011632354B2

(12) United States Patent
Venaas et al.

(10) Patent No.: US 11,632,354 B2
(45) Date of Patent: Apr. 18, 2023

(54) METHODS AND APPARATUSES FOR SOURCE DISCOVERY

(71) Applicant: Cisco Technology, Inc., San Jose, CA (US)

(72) Inventors: Stig Ingvar Venaas, Oakland, CA (US); Mahesh Sivakumar, Milpitas, CA (US); Ijsbrand Wijnands, Leuven (BE); Mankamana Prasad Mishra, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 16/117,641

(22) Filed: Aug. 30, 2018

(65) Prior Publication Data

US 2020/0076767 A1 Mar. 5, 2020

(51) Int. Cl.
| | | |
|---|---|---|
| *G06F 15/16* | (2006.01) | |
| *H04L 61/59* | (2022.01) | |
| *H04L 12/46* | (2006.01) | |
| *H04L 45/00* | (2022.01) | |
| *H04L 49/201* | (2022.01) | |
| *H04L 61/103* | (2022.01) | |

(52) U.S. Cl.
CPC .......... *H04L 61/59* (2022.05); *H04L 12/4633* (2013.01); *H04L 45/22* (2013.01); *H04L 45/70* (2013.01); *H04L 45/72* (2013.01); *H04L 49/201* (2013.01); *H04L 61/103* (2013.01); *H04L 2212/00* (2013.01)

(58) Field of Classification Search
CPC . H04L 61/6013; H04L 12/4633; H04L 45/22; H04L 45/70; H04L 45/72; H04L 49/201; H04L 61/103; H04L 2212/00

USPC .......................................................... 709/245
See application file for complete search history.

(56) References Cited

U.S. PATENT DOCUMENTS

| | | | |
|---|---|---|---|
| 9,843,513 B2 | 12/2017 | Nagarajan et al. | |
| 9,853,915 B2 | 12/2017 | Ranns et al. | |
| (Continued) | | | |

OTHER PUBLICATIONS

Wijnands et al. ("Multicast Using Bit Index Explicit Replication", Internet Draft, Feb. 2015, Expires Aug. 6, 2015) (Year: 2015).*

(Continued)

*Primary Examiner* — Suraj M Joshi
*Assistant Examiner* — Joel Mesa
(74) *Attorney, Agent, or Firm* — Merchant & Gould P.C.

(57) ABSTRACT

A disclosed method is performed at a first boundary node bordering a BIER domain. The method includes receiving a message associated with a source and group for multicast from outside the BIER domain. The method further includes generating an encapsulated message based on the message, a metric, and a first proxy address of the first boundary node. The method also includes forwarding the encapsulated message through the BIER domain to at least one second boundary node bordering the BIER domain and connectable to the first boundary node. The first boundary node additionally triggers the at least one second boundary node to decapsulate the encapsulated message for forwarding out of the first domain and store a record including the source, the group, the metric representing the cost of the first boundary node to the source, and the first proxy address on the at least one second boundary node.

20 Claims, 9 Drawing Sheets

(56) References Cited

U.S. PATENT DOCUMENTS

| | | | | |
|---|---|---|---|---|
| 2015/0215235 | A1* | 7/2015 | Li | H04L 47/827 |
| | | | | 370/235 |
| 2017/0093689 | A1* | 3/2017 | Manur | H04L 12/18 |
| 2017/0317841 | A1 | 11/2017 | Xu | |
| 2019/0097944 | A1* | 3/2019 | Kotalwar | H04L 12/185 |

OTHER PUBLICATIONS

Wijnands et al. "RFC 8296 Encapsulation for Bit Index Explicit Replication (BIER) in MPLS and Non-MPLS Netowrks" Jan. 2018 ISSN: 2070-1721. (Year: 2018).*

Venaas Ij Wijnanus M Mishra Cisco Systems s et al: "PIM Flooding Mechanism and Source Discovery for BI ER; draft-venaas-bier-pfm-sd-00.txt", PIM Flooding Mechanism and Source Discovery For BI ER; Draft-Venaas-Bier-PFM-SD-00.txt; Internet-Draft: Network Working Group, Internet Engineering Task Force, I ETF; Standardworkingdraft, Internet Society ( I SOC) 4, Rue Des Fala I Ses CH—1205 Geneva, sw. Oct. 23, 2018 (Oct. 23, 2018), pp. 1-8. XP015129544.

International Search Report and Written Opinion issued in Application No. PCT/US2019/048367 dated Oct. 9, 2019 (15 pages).

H. Bidgoli et al., "PIM Signaling Through Bier Core (draft-ietf-bier-pim-signaling-03)", Bier Workgroup, Internet Draft. Jun. 21, 2018, pp. 1-13.

Greg Shepherd, "Bit Indexed Explicit Replication Bier", Stateless Multi-Point Replication, RIPE, May 2015, pp. 1-33.

Wijnands et al., "PIM Flooding Mechanism (PFM) and Source Discovery (SD)", Internet Engineering Task Force RFC 8364, Mar. 2018, pp. 1-18.

Pfister et al., "BIER Ingress Multicast Flow Overlay using Multicast Listener Discovery Protocols draft-ietf-bier-mld-00", Jun. 29, 2017, pp. 1-14.

* cited by examiner

METHODS AND APPARATUSES FOR SOURCE DISCOVERY

TECHNICAL FIELD

The present disclosure relates generally to computer network, and more particularly, to methods and apparatuses for source device discovery in a mixed protocol computer network.

BACKGROUND

A computer network is a collection of interconnected computing devices that exchange data and share resources. In some cases, the computer network transports multicast traffic, such as desktop conferences, corporate broadcasts, music and video web casts, and other forms of multimedia content. A number of protocols have been implemented to facilitate multicast routing, e.g., Protocol Independent Multicast (PIM), Bitwise Index Explicit Replication (BIER), Internet Group Management Protocol (IGMP), etc. In mixed protocol networks implementing BIER, e.g., mixing PIM and BIER or implementing IGMP signaling over BIER, previously existing systems and methods do not have an effective solution for determining to which upstream BIER router to send the PIM or IGMP messages. Consequently, there is a lack of confidence that the PIM or IGMP messages are sent to upstream BIER router(s) efficiently, e.g., on the best routing path towards active source(s).

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1A:
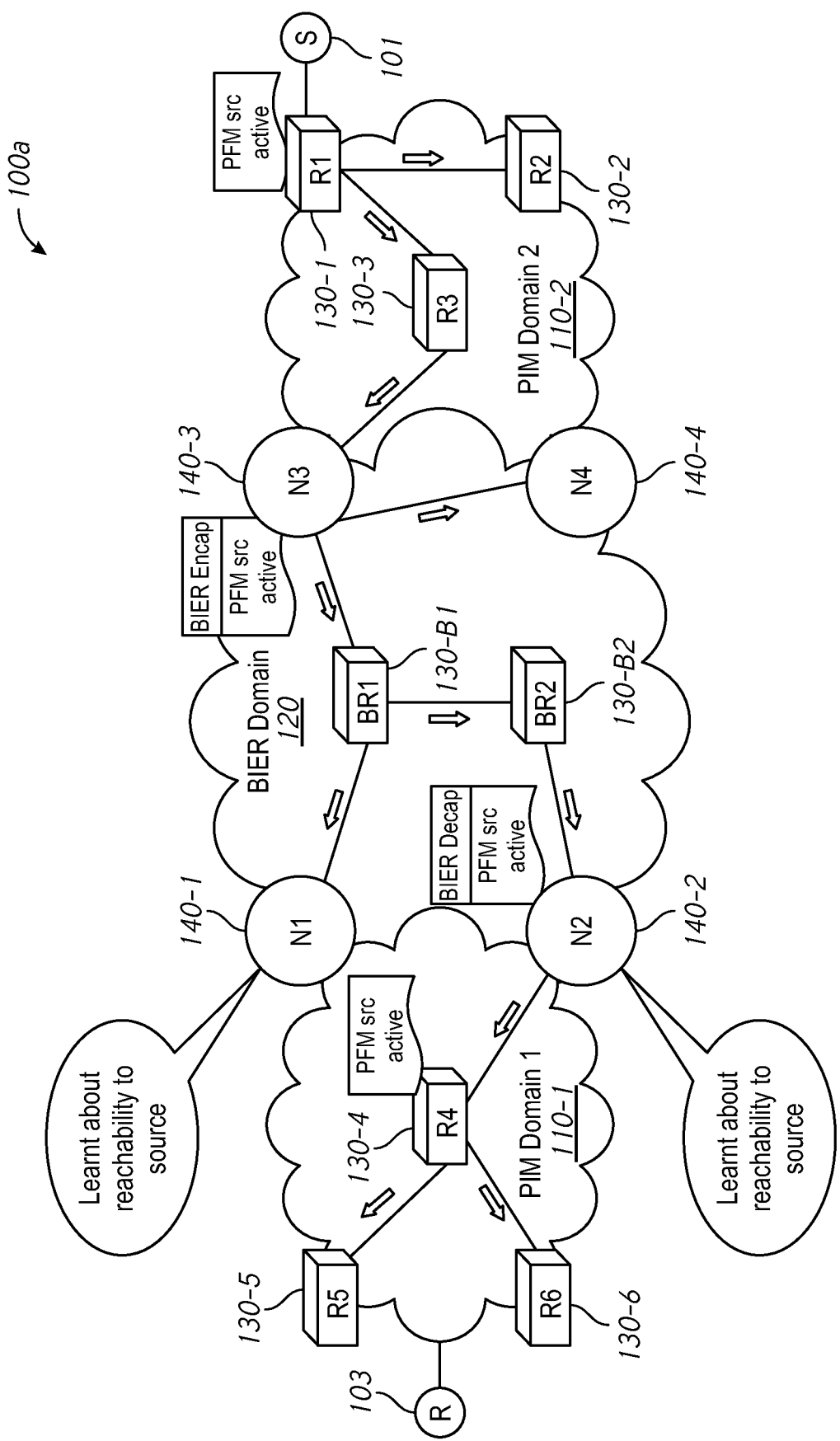
FIGS. 1A and 1B are illustrations of PFM message flooding over a mixed BIER PIM network in accordance with some implementations.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Disclosed herein are methods and apparatuses for source device discovery in a computer network with Bitwise Index Explicit Replication (BIER) protocol. Systems and methods have been implemented using a number of protocols for multicast routing. For example, Protocol Independent Multicast (PIM) builds distribution trees through a network in order to facilitate multicast routing. The distribution trees transport multicast traffic from source devices (also known as sources) to receiver devices (also known as receivers or subscriber devices) for multicast groups. The Internet Group Management Protocol (IGMP) is another multicast protocol used by hosts and adjacent routers to establish multicast group memberships. PIM and IGMP face potential scalability challenges when deployed in data centers. These challenges are typically due to the specification to build and maintain the distribution tree and to hold per-flow state in routers. BIER is a multicast forwarding paradigm that avoids these two specifications. Different from PIM, BIER does not have explicit tree-building. Further, BIER does not have intermediate nodes to maintain per-flow state information. As such, many data centers have migrated at least parts of their networks to BIER domains.

Mixed protocol networks face a number of challenges. For example, in a BIER and PIM network, if the shortest path from the source to the receiver passes a BIER domain, the tree building by PIM joins stops at a border between the BIER and PIM domain. In another example, when implementing IGMP signaling over a BIER domain and ASM is used, IGMP in existing systems and methods have no knowledge of active sources. As a result, IGMP reports are flooded to BIER routers in the BIER domain regardless of whether or not a respective BIER router is connectable to an active source. This can cause duplication of traffic in the BIER domain. Some existing systems and methods attempt to solve the problem by storing information about which BIER routers are receivers for which groups on BIER edge routers. However, the extra information stored creates state maintenance overhead.

By contrast, methods and apparatuses of the present disclosure solve the aforementioned problems. In some implementations, a metric and a proxy address of a boundary router on a border between a BIER domain and a PIM domain are stored during source discovery. The metric and the border proxy address are then used for determining an upstream BIER router that is on the best path towards a source during multicast join signaling. As such, the routing in mixed BIER PIM networks is efficient, e.g., duplication of traffic in the BIER domain can be avoided during IGMP signaling, less state information is maintained, and PIM join messages are sent to a BIER boundary node that is the closest to the source, etc.

In some implementations, a method is performed at a first boundary node bordering a first domain (e.g., a BIER domain). The first boundary node is a networking device that includes at least one or more processors and non-transitory memory. In some implementations, the first boundary node receives a message (e.g., a PIM Flooding Mechanism (PFM) message) from outside the first domain, where the message is associated with a source and a group for multicast. The first boundary node generates an encapsulated message based on the message, a metric representing a cost of the first boundary node to the source, and a first proxy address of the first boundary node. The first boundary node further forwards the encapsulated message through the first domain (e.g., the BIER domain) to at least one second boundary node bordering the first domain and connectable to the first boundary node. The first boundary node additionally triggers the at least one second boundary node to decapsulate the encapsulated message for forwarding out of the first domain and store a record including the source, the group, the metric representing the cost of the first boundary node to the source, and the first proxy address of the at least one second boundary node.

In some implementations, a method is performed at a first boundary node bordering a first domain (e.g., a BIER domain). The first boundary node is a networking device that includes at least one or more processors and non-transitory memory. In some implementations, the first boundary node receives a message (e.g., a PFM message) from outside the first domain, where the message is associated with at least one source and a group for multicast. The first boundary node selects at least one second boundary node from one or more boundary nodes bordering the first domain. In some implementations, based on stored records including sources, groups, metrics, and proxy addresses, a respective second boundary node of the at least one second boundary node has a best path (e.g., shortest path to the source, network condition, performance, delay etc.) among the one or more boundary nodes to the at least one source for the group. The first boundary node then obtains at least one proxy address corresponding to the at least one second boundary node and forwards the message through the first domain (e.g., the BIER domain) to the at least one second boundary node according to the at least one proxy address.

EXAMPLE EMBODIMENTS

Referring to FIG. 1A, an illustration of PFM message flooding over a mixed BIER PIM network 100A for source discovery is shown in accordance with some implementations. In some implementations, the techniques described herein extend the concepts of Internet Engineering Task Force RFC 8364 ("PIM Flooding Mechanism (PFM) and Source Discovery (SD)," Wijnands et al., March 2018, hereinafter "RFC 8364"), the entire content of which is incorporated herein by reference. Relative to the concepts disclosed in RFC 8364, the techniques described herein allow efficient PFM message forwarding through BIER domain.

PIM Sparse Mode (PIM-SM) uses a Rendezvous Point (RP) and shared trees to forward multicast packets from new sources. Once Last-Hop Routers (LHRs) receive packets from a new source, the LHRs may join the Shortest Path Tree (SPT) for the new source for efficient forwarding. PIM Flooding Mechanism (PFM) Source Discovery (PFM-SD) as described in RFC 8364 provides a way to support PIM-SM without PIM registers, RPs, or shared trees. Multicast source information is flooded throughout the multicast domain using PFM messages. This allows LHRs to learn about new sources without receiving initial data packets.

In previously existing systems implemented according to RFC 8364, PFM messages are sent by PIM hop-by-hop to flood information, such as active sources. However, such systems and methods do not define a mechanism that allows PFM-SD to be used efficiently in mixed BIER PIM networks. In accordance with implementations described herein, PFM messages can be flooded via BIER in the mixed BIER PIM network for source discovery.

According to RFC 8364, each first hop router (FHR), which is directly connected to an active multicast source, originates PFM messages to distribute information to other routers in a network. When the router originates the PFM message, it puts one of its own addresses in an originator field of the PFM message. Other information in the PFM message include source, group, and one or more type-length-value fields (TLVs), e.g., group source hold time (GSH) TLV, etc. Further according to RFC 8364, as long as the multicast source is active, the source information is included in a PFM message sent from the FHR every Group_Source_Holdtime_Period seconds. As will be described below, in accordance with implementations described herein, the PFM messages are sent through the mixed BIER PIM network 100A so that boundary nodes can learn about the reachability of upstream BIER nodes to the source. As will be described below with reference to FIGS. 3A and 3B, the learned reachability information can then be used to improve the efficiency in multicast join signaling in the mixed BIER PIM network.

In FIG. 1A, the mixed BIER PIM network 100A includes a first PIM domain 110-1, a BIER domain 120, and a second PIM domain 110-2. The first PIM domain 110-1 and the second PIM domain 110-2 are separated by the BIER domain 120. Each of the domains 110-1, 120, and 110-2 includes a plurality of routing devices for routing packets between a source device 101 and a receiver device 103. Among the plurality of routing devices, some are boundary nodes. For example, routers R4 130-4, R5 130-5, and R6 130-6 are inside the first PIM domain 110-1, routers BR1 130-B1 and BR2 130-B2 are inside the BIER domain 120, and routers R1 130-1, R2 130-2, and R3 130-3 are inside the second PIM domain 110-2. Bordering the first PIM domain 110-1 and the BIER domain 120 are boundary nodes N1 140-1 and N2 140-2; and bordering the BIER domain 120 and the second PIM domain 110-2 are boundary nodes N3 140-3 and N4 140-4. The plurality of routers R1-R6 130 and N1-N4 140 route packets through the mixed BIER PIM network 100A.

As indicated by the arrows in FIG. 1A, the FHR R1 130-1, which is directly connected to the source 101, originates a PFM source active message indicating that the source 101 is an active source. The PFM source active message floods the second PIM domain 110-2, e.g., from R1 130-1 to R2 130-2 and from R1 130-1 to R3 130-3. Further, the PFM source active message is forwarded by R3 130-3 to the boundary node N3 140-3. The boundary node N3 140-3 then encapsulates the PFM source active message and sends the encapsulated PFM source active message to the boundary nodes N1 140-1, N2 140-2, and N4 140-4 via the nodes BR1 130-B1 and BR2 130-B2 in the BIER domain 120. At the boundary node N2 140-2, the encapsulated PFM source active message is decapsulated prior to being forwarded to the first PIM domain 110-1. Additionally, as will be described below with reference to FIG. 1B, the boundary nodes N1 140-1 and N2 140-2 learn about the reachability to the source 101, e.g., the cost of N3 140-3 to the source 101. Subsequently, the decapsulated PFM source active message travels through the routers R4 130-4, R5 130-5, and R6 130-6 in the first PIM domain 110-1. As such, the techniques in accordance with various implementations disclosed herein enable PIM routers 130 to make use of PFM-SD even if the path to the source 101 passes through BIER routers 130 and 140.

Figure 1B:
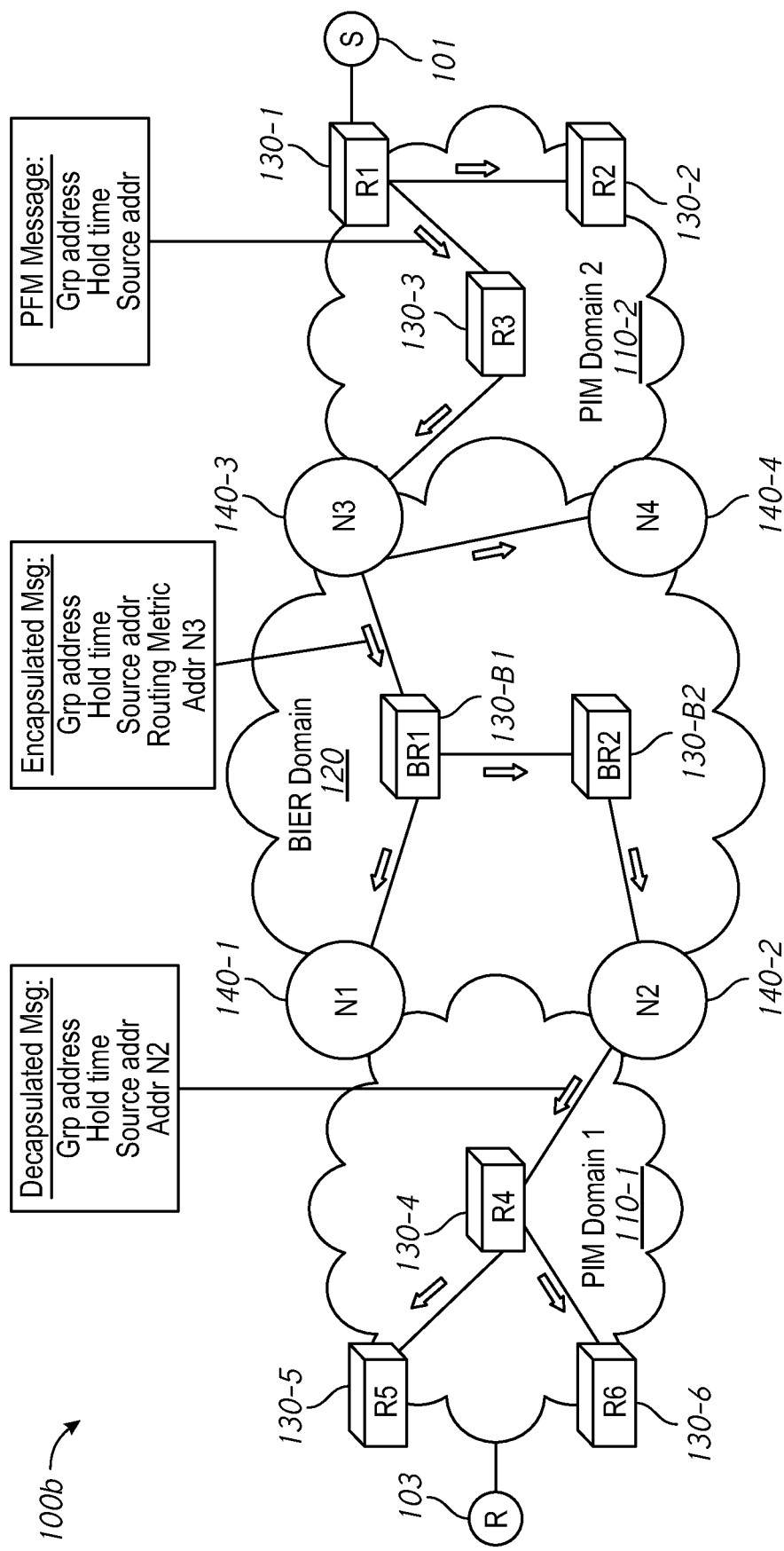

FIG. 1B is an illustration of PFM message flooding over a mixed BIER PIM network 100B for source discovery, in accordance with some implementations. The network 100B illustrated in FIG. 1B is similar to and adapted from the network 100A illustrated in FIG. 1A. Accordingly, elements common to FIGS. 1A and 1B include common reference numbers, and the differences between FIGS. 1A and 1B are described herein for the sake of brevity. As explained above with reference to FIG. 1A, in some implementations, a PFM message includes one or more GSH TLVs. In some implementations, in addition to the one or more GSH TLVs, a metric and a proxy address are added to the PFM message as additional TLVs. In FIG. 1B, the proxy address and the metric are used for determining an upstream BIER router closest to a source.

For instance, the FHR R1 130-1, which is directly connected to the source 101, originates a PFM source active message indicating that the source 101 is an active source. The PFM source active message floods the second PIM domain 110-2, e.g., from R1 130-1 to R2 130-2 and then from R1 130-1 to R3 130-3. Further, the PFM source active message is forwarded by R3 130-3 to the boundary node N3 140-3. When the PFM message is forwarded to the BIER domain 120, the boundary node N3 140-3 encapsulates the PFM source active message by adding its own address and a routing metric in accordance with some implementations. The routing metric is further described below with reference to FIG. 2. The boundary node N3 140-3 then forwards the encapsulated PFM source active message to the boundary nodes N1 140-1, N2 140-2, and N4 140-4 via the nodes BR1 130-B1 and BR2 130-B2 in the BIER domain 120.

As will be described below with reference to FIG. 2, nodes associated the BIER domain 120 receive the encapsulated PFM source active message, obtain information such as the border proxy address and the metrics from the encapsulated message, and store the obtained information in a cache. For instance, following the arrows indicating flows of PFM messages, a plurality of nodes associated with the BIER domain 120, including N4 140-4, BR1 130-B1, BR2 130-B2, N1 140-1, and N2 140-2, receive the encapsulated message directly or indirectly from N3 140-3. Each of the nodes N4 140-4, BR1 130-B1, BR2 130-B2, N1 140-1, and N2 140-2 stores the border proxy address and the metrics in its respective cache.

In some implementations, in addition to obtaining information from the encapsulated messages, a boundary node also replaces information in the received messages in preparation for forwarding the messages. For example, at the boundary node N2 140-2, the encapsulated PFM source active message is decapsulated by removing the routing metric and replacing the proxy address of N3 240-3 with a proxy address of N2 140-2. Further, though not shown in FIG. 1B, in some implementations, the boundary node N2 140-2 also replaces the routing metric, e.g., replacing with a routing metric indicating the cost of node N2 140-2 to the source 101. The decapsulated message is then forwarded to the first PIM domain 110-1.

In accordance with various implementations disclosed herein, the routing metrics and the proxy addresses obtained during source discovery represent the reachability of the BIER boundary nodes 140 to the source 101. In other words, a boundary node 140 adds its own proxy address and the metrics to the source 101 in messages it forwards. Other non-boundary nodes (e.g., BR1 130-B1 and/or BR2 130-B2) receive the messages, cache the metrics and proxy information obtained from the messages, and forward the messages without modifying the metrics or proxy information. Such information can be used for efficient multicast join signaling over the BIER domain 120, as will be described in detail below with reference to FIGS. 3A and 3B.

Figure 2:
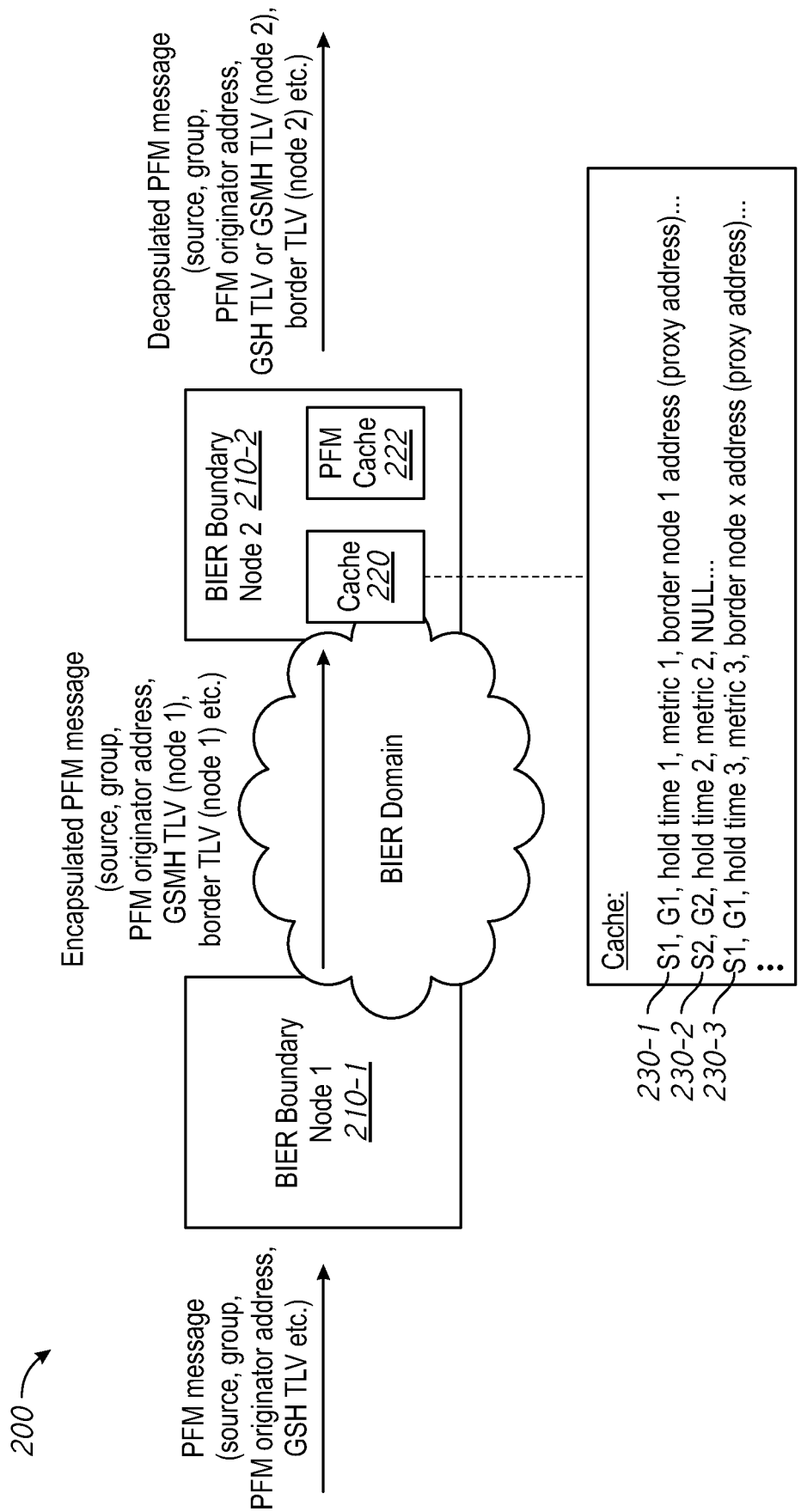
FIG. 2 is an illustration of PFM message encapsulation and decapsulation through a mixed BIER PIM network in accordance with some implementations.

FIG. 2 is an illustration of PFM message encapsulation and decapsulation through a mixed BIER PIM network 200 in accordance with some implementations. As explained above with reference to FIGS. 1A and 1B, when a first BIER boundary node 210-1 receives a PFM message from a PIM domain, it encapsulates the PFM message before forwarding the encapsulated PFM message to a second BIER boundary node 210-2.

In some implementations, the first BIER boundary node 210-1 encapsulates the PFM message by replacing the GSH TLV with GSHM TLV, which includes a metric in addition to the GSH. In some implementations, the metric indicates the cost from the first BIER boundary node 130-1 to the source. For example, in FIGS. 1A and 1B, the boundary node N3 140-3 encapsulates the PFM message by including the cost of N3 140-3 to the source 101 through the second PIM domain 110-2.

In some implementations, the first BIER boundary node 210-1 further encapsulates the PFM message by adding a border proxy TLV. For instance, when a router borders on the PIM domain and the BIER domain or is a BIER router receiving a PFM message from a PIM neighbor, the router adds in the PFM message a border TLV, e.g., the first BIER boundary node 210-1 adding its own proxy address to the message in border TLV. When the encapsulated message is forwarded further, the border TLV stays in the encapsulated message in accordance with some implementations.

In some implementations, once the second BIER boundary node 210-2 receives the encapsulated PFM message, the second BIER boundary node 210-2 retrieves information from the encapsulated PFM message and refreshes information stored in a cache 220. In some implementations, the cache 220 includes a plurality of entries, e.g., entries 230-1, 230-2, 230-3, etc. For example, the first entry 230-1 includes a source address (S1) and a group address (G1) derived from the PFM message, GSH (hold time 1) and a metric (metric 1) extracted from the GSMH TLV in the encapsulated PFM message; and a border node proxy address (border node 1 address) extracted from the border proxy TLV in the encapsulated PFM message. Likewise, the third entry 230-3 includes the source address (S1), the group address (G1), GSH (hold time 2), the metric (metric 3), and the border node proxy address (border node×address).

Further, in some implementations, the second BIER boundary node 210-2 decapsulates the PFM message by replacing the border proxy TLV of the first BIER boundary node 210-1 with the border proxy of the second BIER boundary node 210-2. In some implementations, the second BIER boundary node 210-2 also decapsulates the PFM message by replacing the GSMH TLV with GSH TLV before forwarding the decapsulated message to an adjacent PIM domain. In some other implementations, Further, in some implementations, since the GSMH TLV provides additional routing information, the second BIER boundary node 210-2 replaces GSMH of the first BIER boundary node 210-1 with GSMH of the second BIER boundary node 210-2. In such implementations, when the decapsulated message is forwarded, e.g., into an adjacent PIM domain, the GSMH TLV stays in the decapsulated message.

In some implementations, as will be described below with reference to FIGS. 3A and 3B, when the second BIER router 210-2 is using PIM overlay to send a PIM join for (S1, G1), it looks up (S1, G1) in the cache 220. Based on the value of metric 1 and metric 3, the second BIER router 210-2 selects the border router with the smallest metric as the PIM Reverse Path Forwarding (RPF) address and sends PIM join/prunes for the multicast represented by (S1, G1) to that proxy address.

In some implementations, when a BIER router is directly connected to a source, the encapsulated message does not have a border TLV. As a result, an entry in the cache derived from such an encapsulated message does not have a value in the border proxy address field. For example, the second entry 230-2 in the cache 220 has NULL as border proxy address. When an entry with NULL in the border proxy address exists, metrics would not be compared for the corresponding source and group in order to select an upstream BIER router that is the closest to the source. For example, since the second entry 230-2 has NULL in the border proxy address field, the second BIER boundary node 210-2 would not compare metrics in the entries 230 in order to select an upstream BIER node to forward the message for multicast associated with (S2, G2). In that case, the second BIER boundary node 210-2 looks up information in a PFM cache 222 in order to select the upstream BIER node. In some implementations, The PFM cache 222 stores information derived from the PFM message, such as PFM originator address, etc. Since the BIER router that is directly connected to the source is the closest to the source, the PFM message originator address included in the PFM message and stored in the PFM cache 222 for the multicast flow represented by (S2, G2) is the upstream router address to forward the PIM join message.

Figure 3A:
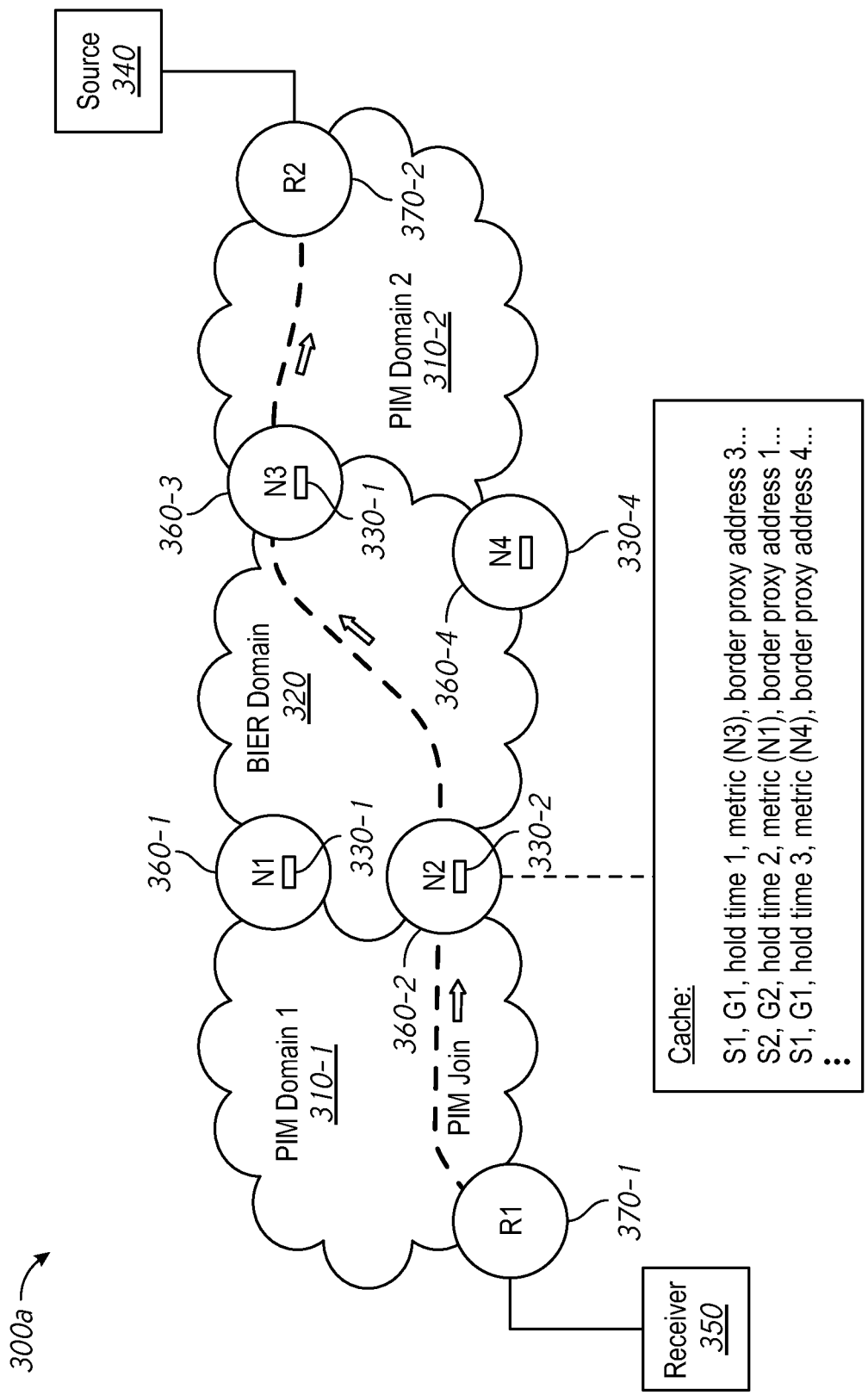
FIGS. 3A and 3B are examples of PIM signaling over mixed BIER PIM networks in accordance with some implementations.

Turning to FIG. 3A, a network 300A with two PIM domains and one BIER domain with a PIM join message through the network 300A is shown in accordance with some embodiments. FIG. 3A illustrates techniques of efficient routing with less state information through the mixed PIM BIER network 300A. As a non-limiting example, the network 300A includes a first PIM domain 310-1 that implements PIM protocol, a BIER domain 320 that implements BIER protocol, and a second PIM domain 310-2 that implements PIM protocol. The first PIM domain 310-1 and the second PIM domain 310-2 are separated by the BIER domain 320.

When a receiver 350 is interested in receiving multicast traffic from a source 340 for a group, the receiver 350 initiates an IGMP join towards a last-hop router (LHR) R1 370-1 for the multicast flow (S, G). Assuming that a routing device R1 370-1 is selected as the PIM designated router connected to the receiver 350, the router R1 370-1 initiates a PIM join towards the source 340. In FIG. 3A, the network 300A includes a plurality of routing devices 360 and 370 for forwarding the PIM join message. Among the plurality of routing devices, routers N1 360-1, N2 360-2, N3 360-3, and N4 360-4 are boundary nodes.

In some implementations, the boundary routing devices N1 360-1, N2 360-2, N3 360-3, and N4 360-4 are proxy nodes that are located on domain boundaries, e.g., the boundary nodes N1 360-1 and N2 360-2 between the first PIM domain 310-1 and the BIER domain 320, and the boundary nodes N3 360-3 and N4 360-4 are between the BIER domain 320 and the second PIM domain 310-2. From a PIM domain (e.g., the PIM domain 310-1 or 310-2) perspective, the boundary nodes N1 360-1, N2 360-2, N3 360-3, and N4 360-4 maintain PIM adjacency for routers connectable to them in the PIM domain and terminate the PIM adjacency toward the BIER domain 320. Likewise, from a BIER domain (e.g., the BIER domain 320) perspective, the boundary nodes N1 360-1, N2 360-2, N3 360-3, and N4 360-4 maintain BIER adjacency for routers connectable to them in the BIER domain 320 and terminate the BIER adjacency toward the PIM domains 310-1 and 310-2.

As described above with reference to FIG. 2, a cache 330 on each of the boundary nodes 360 includes metrics indicating costs of BIER boundary nodes 360 to the source 340. For example, the cache 330-2 stored on the boundary node N2 360-2 includes metrics indicating cost of the boundary node N1 360-1 corresponding to border proxy address 1 for multicast (S2, G2), cost of the boundary node N3 360-3 corresponding to border proxy address 3 for multicast (S1, G1), and cost of the boundary node N4 360-4 corresponding to the border proxy 4 for multicast flow (S1, G1). The cost for the boundary node N3 360-3, for instance, includes the number of hops, travel time, etc. from the boundary node N3 360-3 to the source 340 through the second PIM domain 310-2. Likewise, the cost for the boundary node N4 360-4, for instance, includes the number of hops, network delay, number of domains, travel time, etc. from the boundary node N4 360-4 to the source 340 through the second PIM domain 310-2.

Using the metrics stored in the cache 330, a BIER boundary node that has the lowest cost to the source 340 is selected to receive the PIM join message through the BIER domain 320. For example, in FIG. 3A, assuming the metric for the boundary node N3 330-3 is smaller than metric for the boundary node N4 330-4, the metrics indicate that the boundary node N3 360-3 is the closest to the source 340 for multicast (S1, G1) among the BIER boundary nodes 360. Thus, the boundary node N3 360-3 corresponding to the border proxy address 3 is selected from the boundary nodes N1 360-1, N3 360-3, and N4 360-4 as the upstream node for receiving the PIM join message to the multicast flow (S1, G1) through the BIER domain 320. In some implementations, upon receiving the PIM join message, the boundary node N3 360-3 is configured to process PIM messages as usual, e.g., forwarding the PIM join message towards the source 340. Accordingly, following the dotted line, the PIM join message is sent from the LHR R1 370-1 to the FHR R2 370-2 efficiently.

Figure 3B:
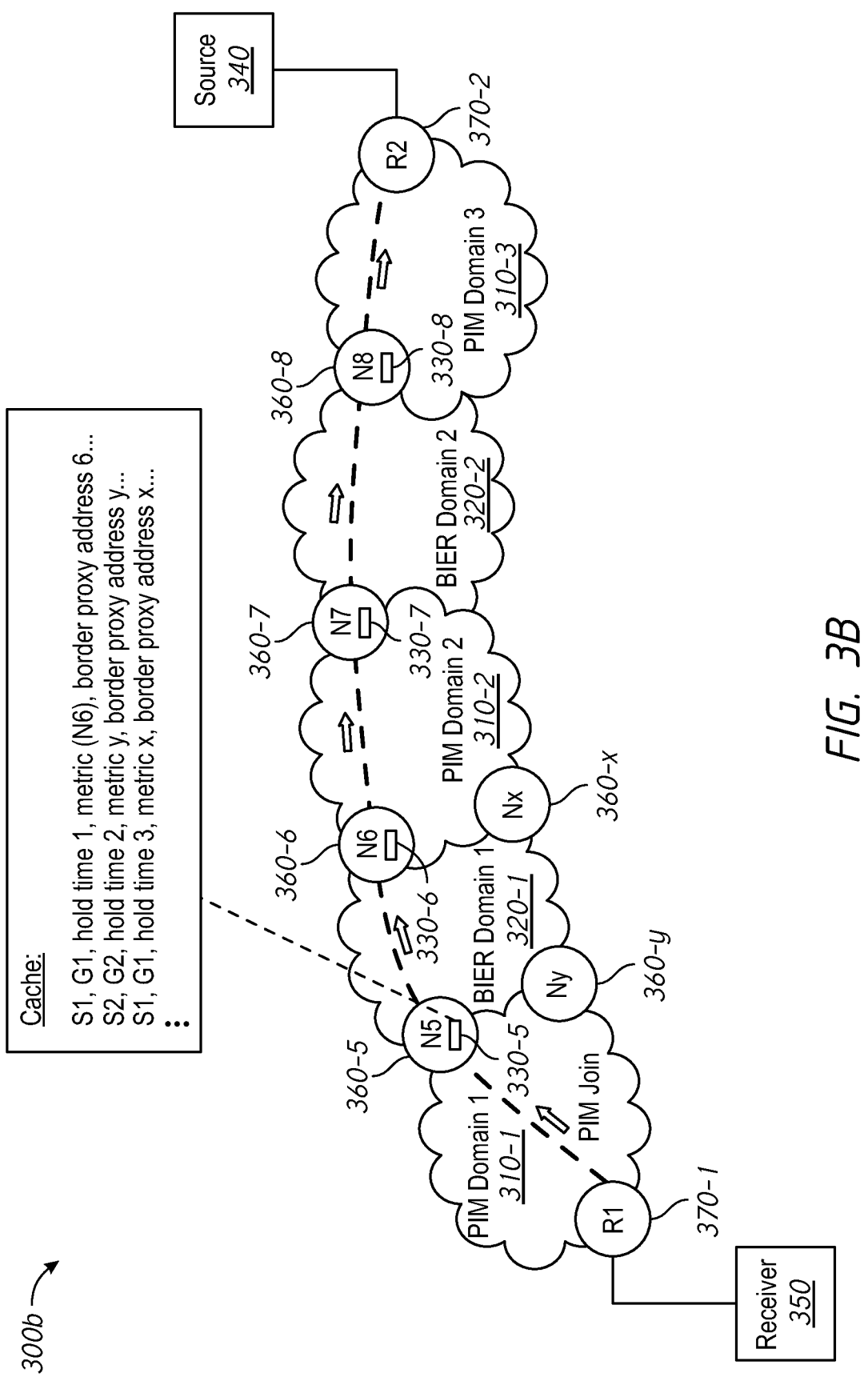

Turning to FIG. 3B, a network 300B with multiple PIM domains and multiple BIER domains with a PIM join message through the network 300B is shown in accordance with some implementations. The network 300B illustrated in FIG. 3B is adapted from the network 300A illustrated in FIG. 3A. Accordingly, elements common to FIGS. 3A and 3B include common reference numbers, and the differences between FIGS. 3A and 3B are described herein for the sake of brevity. As a non-limiting example, for instance, the network 300B includes a first BIER domain 320-1 separating the first PIM domain 310-1 from the second PIM domain 310-2, and a second BIER domain 320-2 separating the second PIM domain 310-2 from a third PIM domain 310-3.

Similar to the network 300A in FIG. 3A, when the receiver 350 is interested in receiving multicast traffic from the source 340 for a group, the receiver 350 initiates an IGMP join towards the LHR R1 370-1 for the multicast flow (S, G). Assuming that the routing device R1 370-1 is selected as the PIM designated router connected to the receiver 350, the router R1 370-1 initiates a PIM join towards the source 340 via a plurality of routing devices.

Different from the network 300A in FIG. 3A, among the plurality of routing devices, routers N5 360-5, N6 360-6, N7

360-7, N8 360-8, Nx 360-x, and Ny 360-y are boundary nodes. Further, different from the network 300A, the boundary node N5 is between the first PIM domain 310-1 and the first BIER domain 320-1; the boundary node N6 is between the first BIER domain 320-1 and the second PIM domain 310-2; the boundary node N7 is between the second PIM domain 310-2 and the second BIER domain 320-2; and the boundary node N8 is between the second BIER domain 320-2 and the third PIM domain 310-3.

In accordance with implementations described herein, the cache 330 on at least some of the boundary nodes 360 includes metrics indicating costs of the BIER boundary nodes 360 to the source 340. For example, in FIG. 3B, the first entry in the cache 330-5 on N5 360-5 includes the metrics indicating the cost from the boundary node N6 360-6 to the source 340 through the second PIM domain 310-2, the second BIER domain 320-2, and the third PIM domain 310-3 for (S1, G1). The second entry in the cache 330-5 includes the metrics indicating the cost from the boundary node Ny 360-x to the source 340 through the second PIM domain 310-2, the second BIER domain 320-2, and the third PIM domain 310-3 for (S2, G2). The third entry in the cache 330-5 includes the metrics indicating the cost from the boundary node Nx 360-x to the source 340 for (S1, G1) etc. Using the metrics stored in the cache 330, a BIER boundary node that has the lowest cost to the source 340 is selected to receive the PIM join message through a respective BIER domain 320. For example, the node N6 360-6 is selected among the boundary nodes Nx 360-x, Ny 360-y, and N6 360-6 as the upstream BIER node to forward the PIM join message through the first BIER domain 320-1. Likewise, though metrics stored in the cache 330-7 on N7 360-7 are not shown in FIG. 3B, based on the metrics stored in the cache 330-7, the node N8 360-8 is selected as the upstream BIER node to forward the PIM join message through the second BIER domain 320-2. Following the dotted line, the network path through the two PIM domains 310 and two BIER domains 320 is the shortest for forwarding the PIM join message.

Though FIGS. 3A and 3B illustrate the PIM domains 310 as being separated by the BIER domain(s) 320, in some implementations, the BIER domains are enclosed by one PIM domain. For example, a pure PIM network can be migrated to BIER by replacing parts of the PIM network with BIER domains. In such mixed BIER PIM network, the BIER domains are islands or patches in the PIM network. For example, the PIM domains 310-1 and 310-2 are one PIM domain surrounding the BIER domain 320 in FIG. 3A, or the PIM domains 310-1, 310-2, and 310-3 are one PIM domain surrounding the BIER domains 320-1 and 320-2 in FIG. 3B. When the shortest path from the source to the receiver passes the BIER domains, the systems and methods disclosed herein can be used to flood PFM messages for source discovery as shown in FIGS. 1A and 1B and can be used to select an upstream BIER router that is the closest to the source for forwarding the PIM join as shown in FIGS. 3A and 3B.

Figure 4:
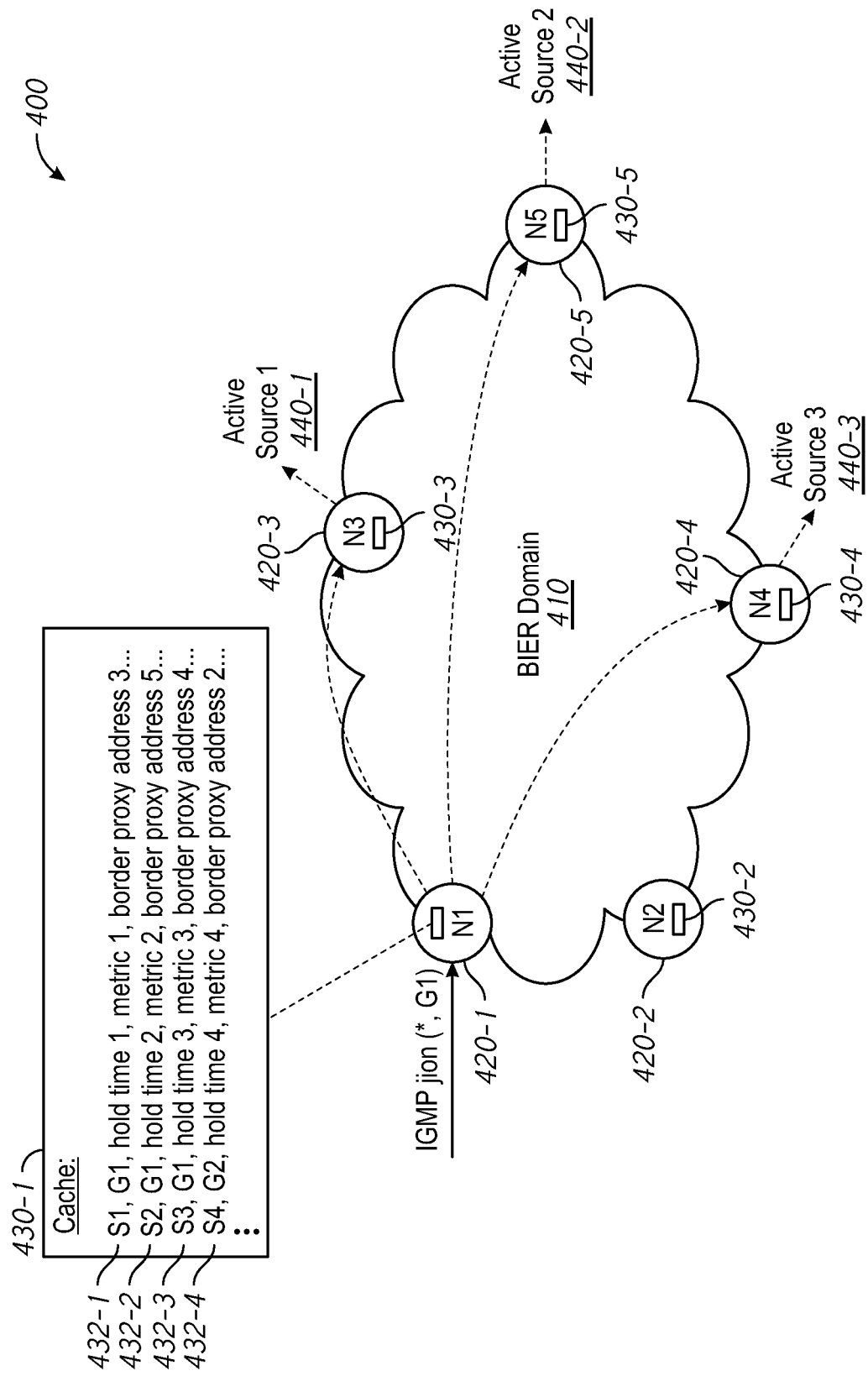
FIG. 4 is an example of IGMP signaling over a mixed BIER PIM network in accordance with some implementations.

FIG. 4 is an illustration of IGMP signaling over a network 400 with a BIER domain 410 in accordance with some implementations. In some implementations, the techniques described herein extend the concepts of Internet Engineering Task Force Internet-Draft ("BIER Ingress Multicast Flow Overlay using Multicast Listener Discovery Protocols draft-ietf-bier-mld-00," Pfister et al., June 2017, hereinafter "IETF Internet-Draft"), the entire content of which is incorporated herein by reference.

The IETF Internet-Draft specifies mechanisms for IGMP signaling in a BIER network. However, when ASM is used, IGMP has no knowledge of active sources. As a result, IGMP reports are flooded to BIER routers in the BIER domain regardless of whether or not a respective BIER router is connectable to an active source. This can cause duplication of traffic in the BIER domain. Some previously existing systems and methods attempt to solve the problem by storing information about which BIER routers are receivers for which groups on BIER edge routers, in case a directly connected host starts sending to the group. However, the extra information stored creates state maintenance overhead in such systems and methods.

In accordance with implementations described herein, the amount of state information can be reduced in networks with a small number of sources and a large number of receivers. Similar to the PIM signaling described above with reference to FIGS. 3A and 3B, in accordance with implementations described herein, BIER routers have stored information in the cache for selecting a BIER router that has the best path to the source. As such, when a BIER router has a local receiver (or receives a PIM join) for a group (or (S, G)), it looks up cached data (e.g., in the cache 220 as shown in FIG. 2) and/or PFM cache (e.g., the PFM cache 222 as shown in FIG. 2) in order to determine which sources are active for the group and which BIER router has the best path to each of the sources. It then sends an IGMP join for the group (or (S, G)) to those BIER routers that are closest to active sources.

For example, in FIG. 4, the BIER domain 410 includes a plurality of routing devices, including boundary nodes N1 420-1, N2 420-2, N3 420-3, N4 420-4, and N5 420-5. In some implementations, as described above with reference to FIG. 2, each of the boundary nodes N1 420-1, N2 420-2, N3 420-3, N4 420-4, and N5 420-5 has a cache 430. On the boundary node N1 420-1, for instance, the cache 430-1 includes a plurality of entries, e.g., 432-1, 432-2, 432-3, 432-4, etc. Each of the entries 432 includes a source address and a group address of a multicast, metric representing a cost from a respective boundary node 420 to the source, and a proxy address of the respective boundary node 420, etc. In some implementations, as explained above with reference to FIGS. 1A and 1B, each time a PFM message is received, the information in the cache 430 is refreshed, e.g., adding a new entry associated with a new (S, G), removing an existing entry when the group source hold time expires (e.g., the source is no longer active), or updating an existing entry to reflect changes to S, G, group source hold time, metric, and/or border node proxy address, etc.

A respective boundary node 420 obtains a corresponding cache 430. The cache 430 indicates a list of active sources 400 for each group. For example, the entries 432 in the cache 430-1 include at least three entries 432-1, 432-2, and 432-3 for group G1. The first entry 432-1 indicates that a first active source 440-1 is an active source associated with the group G1, and the boundary node N3 430-3 has the lowest metric to the first active source 440-1 with its proxy address recorded in the entry 432-1. Likewise, the second entry 432-2 and third entry 432-3 indicate that a second active source 440-2 and a third active source 440-3 are also active sources associated with the group G1, and the metrics and proxy addresses of the boundary nodes N4 430-3 and N5 430-5 are recorded in these entries 432-2 and 432-3.

When ASM is used, and the node N1 420-1 receives an IGMP join (*, G1), the node N1 420-1 uses the information stored in the cache 430-1 to retrieve a list of active sources, e.g., the active source S1 440-1, S2 440-2, and S3 440-3. Using the list of active sources obtained from the cache 430-1, the node N1 420-1 forwards a respective IGMP report to a respective boundary node with the lowest metric, e.g., forwarding one IGMP report to the node N3 420-3 associated with the first active source 440-1; one IGMP report to the node N4 420-4 associated with the third active source 440-3; and one IGMP report to the node N5 420-5 associated with the second active source 440-2. As such, the IGMP reports are sent to a subset of routers that have active sources associated with a group, e.g., to the nodes N3 430-3, N4 430-4, and N5 430-5, whereas the IGMP report is not sent to the node 420-2. Relative to previously existing IGMP reports flooding systems and methods, techniques in accordance with implementations described herein reduce the amount of state information in the network and avoid sending duplications of traffic. The state maintenance reduction is significant when the network has a small number of sources and a large number of receivers.

Figure 5:
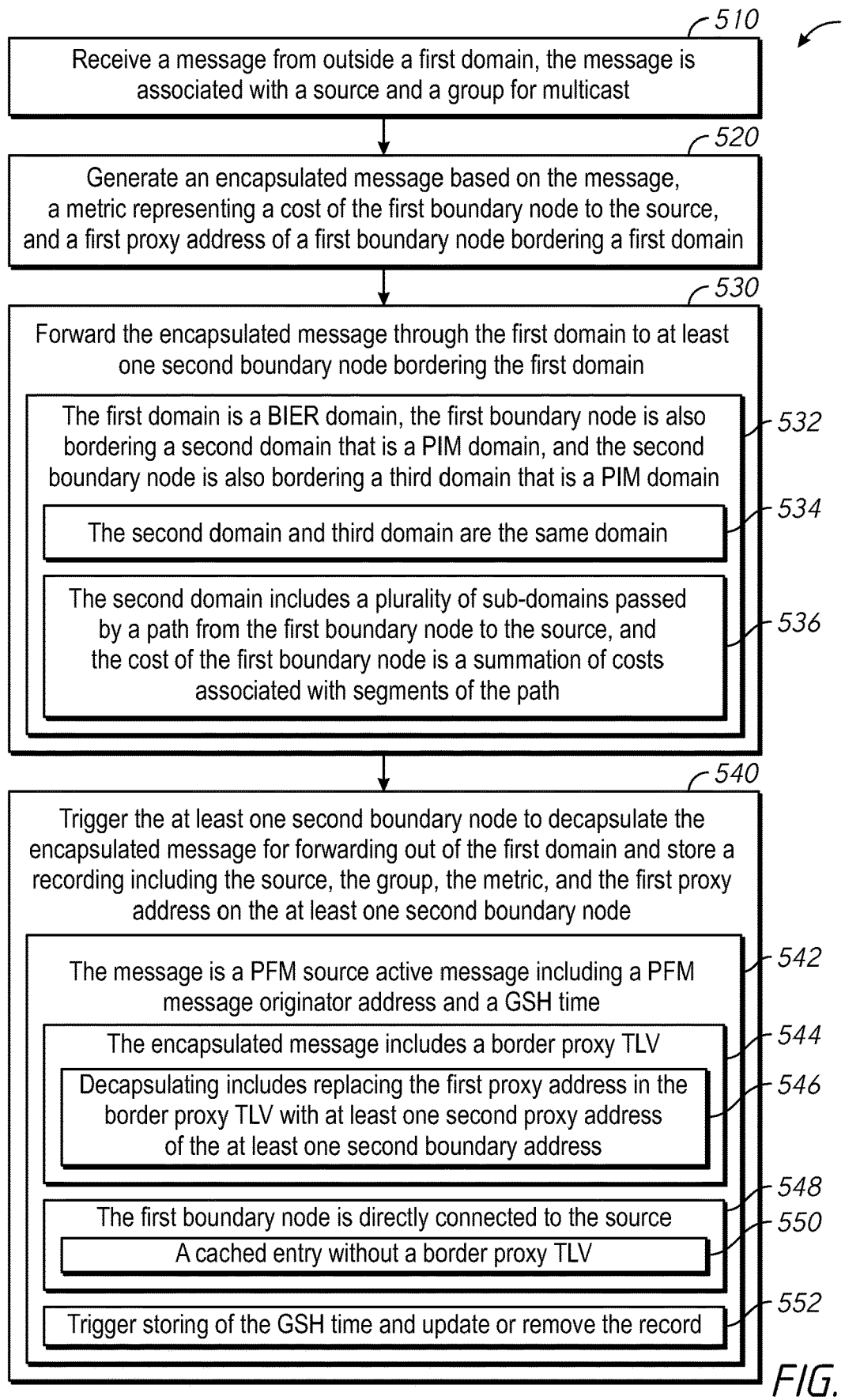
FIG. 5 is a flowchart illustrating a method of source discovery in a mixed protocol network with at least one BIER domain in accordance with some implementations.

FIG. 5 is a flowchart illustrating a method 500 of source discovery in a mixed protocol network with at least one BIER domain in accordance with some implementations. In some implementations, the method 500 is performed at a first boundary node (e.g., an ingress node from a PIM domain into a BIER domain, such as the node N3 140-3 in FIGS. 1A and 1B) with one or more processors and a non-transitory memory. The first boundary node is bordering a first domain, e.g., the node N3 140-3 on the border of the BIER domain 120 in FIGS. 1A and 1B.

Beginning at a start block 510 of FIG. 5, the first boundary node receives a message (e.g., a PFM message) from outside the first domain (e.g., from the PIM domain 110-2 in FIGS. 1A and 1B), where the message is associated with a source and a group for multicast. The method 500 continues, as represented by block 520, with the first boundary node generating an encapsulated message based on the message. In some implementations, the encapsulated message includes a metric representing a cost of the first boundary node to the source and a first proxy address of the first boundary node in addition to the message (e.g., the original PFM message). For example, in FIG. 1B, the PFM message received by the node N3 140-3 includes the source address, the group address, and the group source hold time. The node N3 140-3 encapsulates the PFM message to include the routing metric and the proxy address of N3 140-3.

The method 500 continues, as represented by block 530, with the first boundary node forwarding the encapsulated message through the first domain to at least one second boundary node bordering the first domain and connectable to the first boundary node. For example, in FIGS. 1A and 1B, the node N3 140-3 forwards the encapsulated message, so that the encapsulated message traverses the BIER domain 120 and reaches the boundary nodes N1 140-1 and N2 140-2, which are connectable to the node N3 140-3 through the nodes BR1 130-B1 and BR2 130-B2 inside the BIER domain 120.

In some implementations, as represented by block 532, the first domain is a BIER domain, the first boundary node is also bordering a second domain that is a PIM domain, and the second boundary node is also bordering a third domain that is a PIM domain. For instance, the network topologies shown in FIGS. 1A and 1B include two PIM domains 110 separated by one BIER domain 120 with boundary nodes (e.g., N3 140-3 and N2 140-2) on the border between one PIM domain 110 and the BIER domain 120. Likewise, in FIG. 3A, the BIER domain 320 separates two distinct PIM domains 310-1 and 310-2.

Though not shown in the figures, in some implementations, as represented by block 534, the second domain and the third domain are the same domain. For instance, while in the process of gradual migration of parts of a pure PIM network to BIER, the small parts of BIER domains are islands in the PIM network. Consequently, the first and the second boundary nodes are bordering the same BIER domain and the same PIM domain.

Still referring to FIG. 5, as represented by block 536, in some implementations, the second domain includes a plurality of sub-domains passed by a path from the first boundary node to the source. The cost of the first boundary node is a summation of costs associated with segments of the path through the plurality of sub-domains to the source. In other words, the method 500 in accordance with implementations described herein is not limited to one BIER domain in a mixed protocol network. For example, in FIG. 3B, the mixed BIER PIM network 300B includes at least two BIER domains 320-1 and 320-2. In such a network, the cost of the boundary node N6 360-6 to the source 340 is at least a summation of the routing cost from N6 360-6 to N7 360-7 within the second PIM domain 310-2, from N7 360-7 to N8 360-8 within the second BIER domain 320-2, and from N8 360-8 to the FHR 370-2 within the third PIM domain 310-3.

The method 500 continues, as represented by block 540, with the first boundary node triggering the at least one second boundary node to decapsulate the encapsulated message for forwarding out of the first domain and store a record on the at least one second boundary node. In some implementations, the record includes the source, the group, a metric representing the cost of the first boundary node to the source, and the first proxy address on the at least one second boundary node. In some implementations, as represented by block 542, the message is a PFM source active message including a PFM message originator address and a group source hold time. In such implementations, as represented by block 544, the encapsulated message can include a border proxy TLV representing the first proxy address, e.g., the boundary node N3 140-3 adds its proxy address in a border proxy TLV to the encapsulated message as shown in FIG. 1B. When decapsulating such encapsulated messages, as represented by block 546, the at least one second boundary node replaces the first proxy address of the first boundary node in the border proxy TLV with at least one second proxy address of the at least one second boundary node in some implementations. For example, in FIG. 1B, the boundary node N2 140-2 replaces the proxy address of N3 140-3 with the proxy address of N2 140-2.

In some implementations, as represented by block 548, the first boundary node is directly connected to the source. In such implementations, the encapsulated message does not include a border proxy TLV representing the first proxy address, and the first proxy address stored on the at least one second boundary node is NULL. As a result, as represented by block 550, in some implementations, there is a cached (S, G) entry without a border proxy TLV. As explained above with reference to FIG. 2, in such case, the metrics are not compared to determine which upstream boundary node is the closest to the source. The PFM message originator address stored in the PFM cache 222 is the upstream reverse path forward neighbor.

In some implementations, as represented by block 552, the method 500 further includes triggering the at least one second boundary node to store at least one group source hold time obtained from the message. In such embodiments, when another PFM message that is associated with the source and group is received, the first boundary node generates a second encapsulated message based on the second message and forwards the second encapsulated message through the first domain (e.g., the BIER domain) to the at least one second boundary node. Upon receiving the second encapsulated message, the at least one second boundary node refreshes its cached content based on, for instance, whether or not the at least one second boundary node the at least one group source hold time has expired. In accordance with a determination that the at least one group source hold time has not expired, the at least one second boundary node updates the metric based on the second encapsulated message. On the other hand, in accordance with a determination that the at least one group source hold time has expired, the at least one second boundary node removes the record associate with the source, the group, and the first boundary node.

Figure 6:
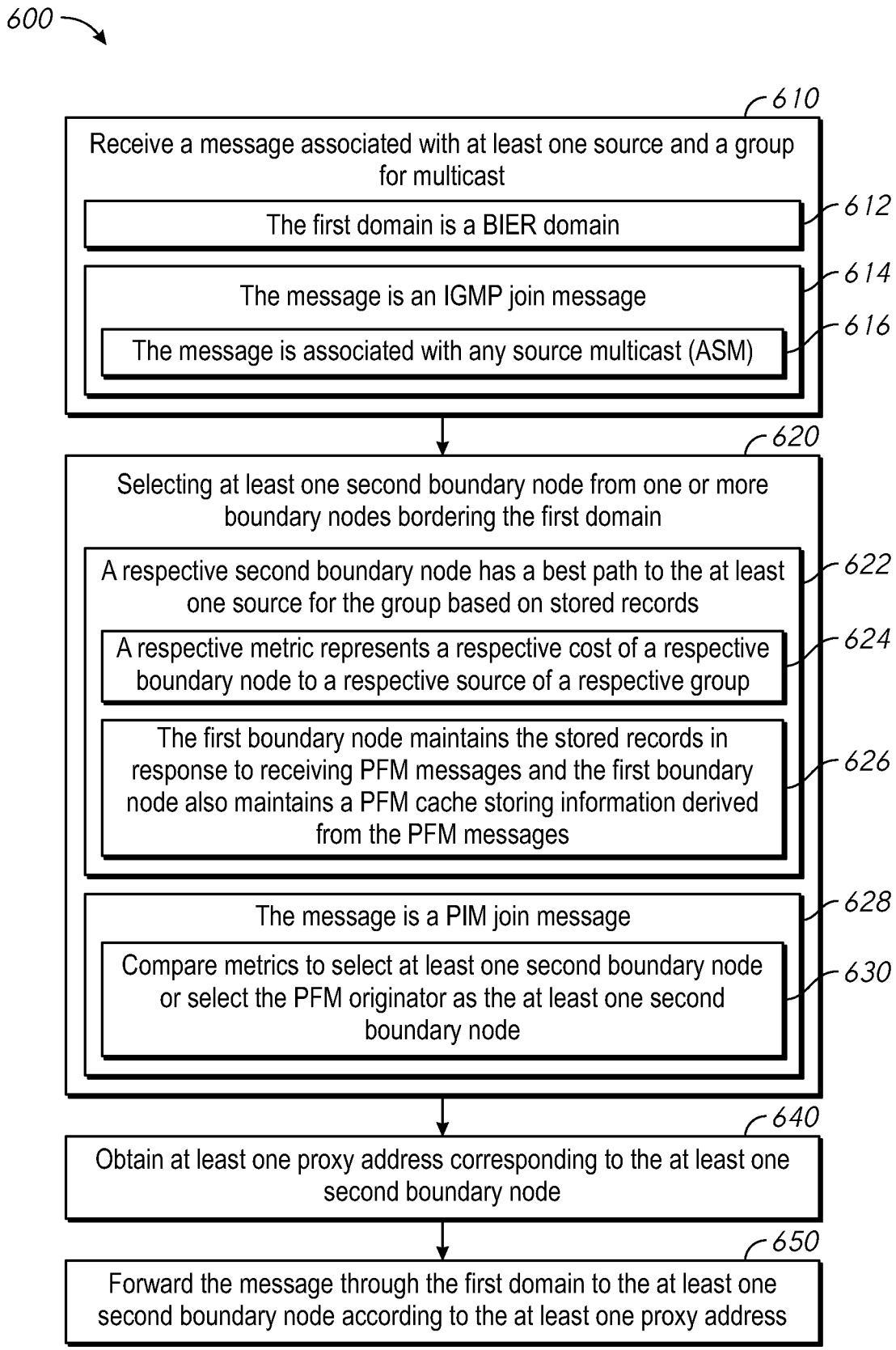
FIG. 6 is a flowchart illustrating a method of multicast join signaling in a mixed protocol network with at least one BIER domain in accordance with some implementations.

FIG. 6 is a flowchart illustrating a method 600 for multicast join signaling in a mixed protocol network with at least one BIER domain in accordance with some implementations. In some implementations, the method 600 is performed at a first boundary node (e.g., an ingress node from a PIM domain into a BIER domain such as the node N2 360-2 in FIG. 3A, the node N5 360-5 or N7 360-7 in FIG. 3B, or the node N1 420-1 in FIG. 4) with one or more processors and a non-transitory memory. The first boundary node is bordering a first domain (e.g., the BIER domain(s) 320 in FIGS. 3A and 3B or the BIER domain 410 in FIG. 4).

Beginning at block 610 of FIG. 6, the first boundary node receives a message associated with at least one source and a group for multicast. In some implementations, as represented by block 612, the first domain is a BIER domain, e.g., the BIER domain(s) 320 in FIGS. 3A and 3B or the BIER domain 410 in FIG. 4. In some implementations, as represented by block 614, the message is an IGMP join message as shown in FIG. 4. In such implementations, as represented by block 616, the IGMP join message can be associated with any source multicast, e.g., (*, G).

The method 600 continues, as represented by block 620, with the first boundary node selecting at least one second boundary node from one or more boundary nodes bordering the first domain. In some implementations, as represented by block 622, based on stored records including sources, groups, metrics, and proxy addresses, a respective second boundary node of the at least one second boundary node has a best path (e.g., shortest path to the source, network condition, performance, delay etc.) among the one or more boundary nodes to the at least one source for the group. In some implementations, as represented by block 624, a respective metric of the metrics stored on the first boundary node in a respective stored record of the stored records represents a respective cost of a respective boundary node to a respective source of a respective group.

For example, FIG. 2 illustrates the stored records 230 in the cache 220. Each of the stored records 230 in the cache 220 includes information such as (S, G, group source hold time, metric, and border proxy address . . . ), with the metric being a cost of the boundary node corresponding to the border proxy address to the source. Using the records 230 stored in the cache 220, in FIG. 3A, N2 360-2 selects the node N3 360-1 among the boundary nodes N1 360-1, N3 360-1, and N4 360-4 to forward the PIM join message through the BIER domain 320. In some implementations, the selection is based on the metrics in the records 230 indicating the node N3 360-3 has the shortest path to the source 340.

In some implementations, as represented by block 626, the first boundary node maintains the stored records in response to receiving PFM messages, and the first boundary node also maintains a PFM cache storing information derived from the PFM messages. For example, as shown in FIG. 2, the boundary node 210-2 maintains the cache 220 and the PFM cache 222. The PFM cache 222 includes information derived from the PFM message, such as PFM originator address etc. The cache 220 includes information such as (S, G, group source hold time, metric, and border proxy address).

In some implementations, the message received by the first boundary node is a PIM join message, as represented by block 628. In such implementations, as further represented by block 630, for a source address, the first boundary node determining whether or not in the stored records, a proxy address associated with the source and the group is NULL. In accordance with a determination that no proxy address associated with the source and the group is NULL, the first boundary node compares metrics in the stored records to select the at least one second boundary node. On the other hand, in accordance with a determination that the proxy address associated with the source and the group is NULL, the first boundary node retrieves a PFM originator address associated with the source and the group from a PFM cache, and selects a node corresponding to the PFM originator address as the at least one second boundary node.

For example, as explained above with reference to FIG. 2, when a BIER node is directly connected to the source, the border proxy address field in the stored records 230 can be NULL, indicating that the BIER node as the PFM originator is already the closest to the source. In such case, the PFM originator address stored in the PFM cache 222 can be used to retrieve the BIER node address and use that address as the upstream BIER node to forward the PIM join to. In other cases, when the stored records 230 do not include a record associated with a multicast (S, G) with the border proxy address being NULL, the metrics are compared in order to select the upstream BIER node with the shortest path to the source.

Continuing with the method 600, as represented by block 640, having selected the at least one second boundary node, the first boundary node obtains at least one proxy address corresponding to the at least one second boundary node. Further, as represented by block 650, the first boundary node forwards the message through the first domain (e.g., the BIER domain) to the at least one second boundary node according to the at least one proxy address.

Figure 7:
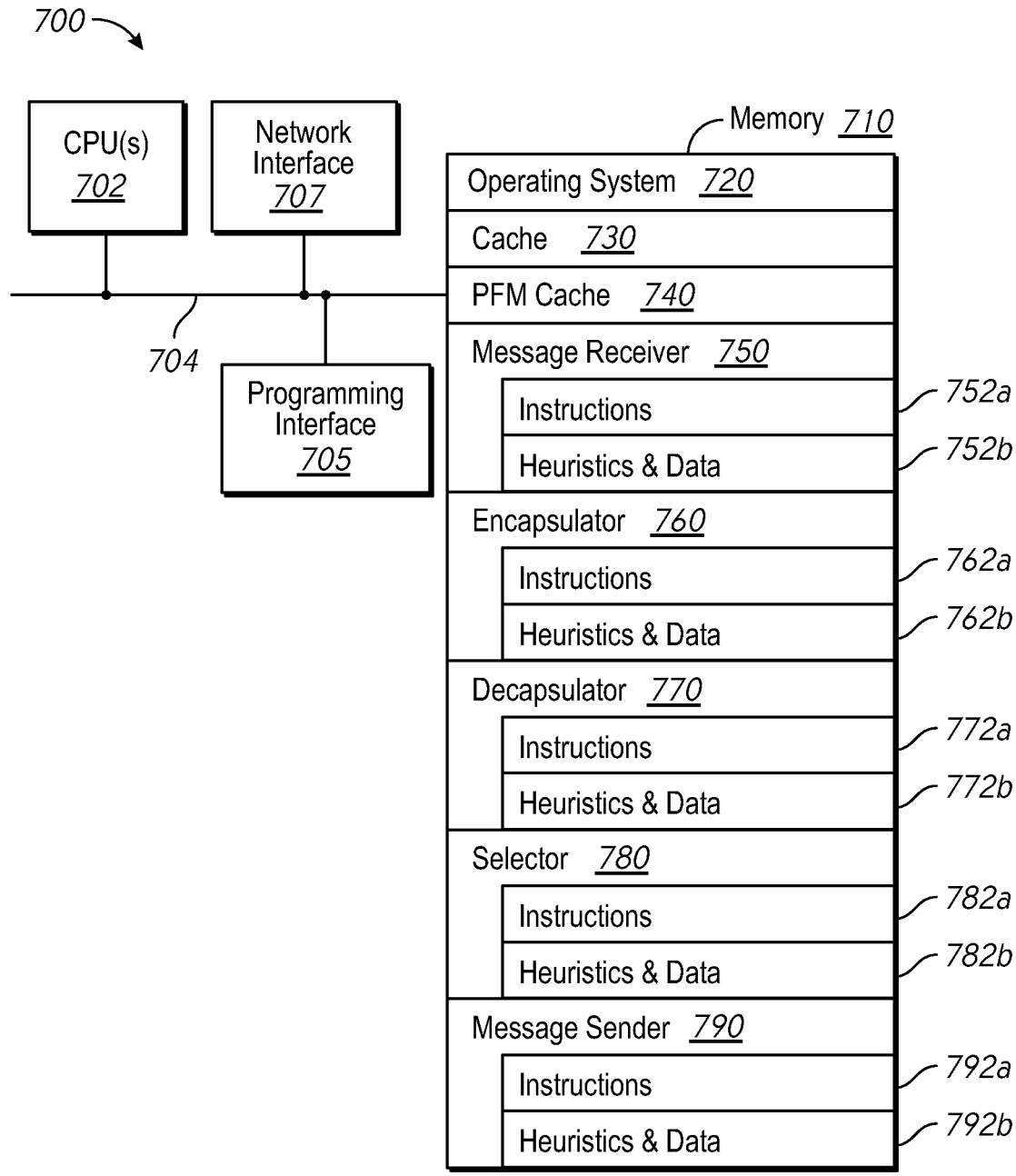
FIG. 7 is a block diagram of a networking device in accordance with some implementations.

FIG. 7 is a block diagram of a networking device 700 in accordance with some implementations. In some implementations, the networking device 700 corresponds to a boundary node bordering a BIER domain, such as the boundary node 140 in FIGS. 1A and 1B, the boundary node 210 in FIG. 2, the boundary node 360 in FIGS. 3A and 3B, or the boundary node 420 in FIG. 4, and performs one or more of the routing functionalities described above with respect to a routing device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the networking device 700 includes one or more processing units (CPU's) 702 (e.g., processors), one or more network interfaces 707, a memory 710, a programming interface 705, and one or more communication buses 704 for interconnecting these and various other components.

In some implementations, the communication buses 704 include circuitry that interconnects and controls communications between system components. The memory 710 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. Moreover, in some implementations, the memory 710 or the non-transitory computer readable storage medium of the memory 710 stores the following programs, modules and data structures, or a subset thereof including an optional operating system 720, a cache 730 (e.g., the cache 220 in FIG. 2, the cache 330 in FIGS. 3A and 3B, and the cache 430 in FIG. 4), a PFM cache 740 (e.g., the PFM cache 222 in FIG. 2), a message receiver 750, an encapsulator 760, a decapsulator 770, a selector 780, and a message sender 790. In some implementations, one or more instructions are included in a combination of logic and non-transitory memory. The operating system 720 includes procedures for handling various basic system services and for performing hardware dependent tasks.

In some implementations, the message receiver 750 is configured to receive a message (e.g., a PFM source active message, a PIM join message, an IGMP join message) from outside the BIER domain. To that end, the message receiver 750 includes a set of instructions 752a and heuristics and data 752b.

In some implementations, the encapsulator 760 is configured to encapsulate the received message in preparation for forwarding the encapsulated message through the BIER domain. To that end, the encapsulator 760 includes a set of instructions 762a and heuristics and data 762b.

In some implementations, the decapsulator 770 is configured to decapsulate the encapsulated message in preparation for forwarding the decapsulated message out of the BIER domain. To that end, the decapsulator 770 includes a set of instructions 772a and heuristics and data 772b.

In some implementations, the selector 780 is configured to select an upstream BIER boundary router to forward the encapsulated message through the BIER domain. To that end, the selector 780 includes a set of instructions 782a and heuristics and data 782b.

In some implementations, the message sender is configured to forward the encapsulated message through the BIER domain. To that end, the message sender 790 includes a set of instructions 792a and heuristics and data 792b.

Although the cache 730, PFM cache 740, message receiver 750, encapsulator 760, decapsulator 770, selector 780, and message sender 790 are illustrated as residing on a single networking device 700, it should be understood that in other embodiments, any combination of the cache 730, PFM cache 740, message receiver 750, encapsulator 760, decapsulator 770, selector 780, and message sender 790 are illustrated as residing on a single networking device 700 can reside in separate computing devices in various implementations. For example, in some implementations, each of the cache 730, PFM cache 740, message receiver 750, encapsulator 760, decapsulator 770, selector 780, and message sender 790 are illustrated as residing on a single networking device 700 resides on a separate computing device.

Moreover, FIG. 7 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
   receiving, at a first boundary node bordering a first domain, a message from outside the first domain, wherein the message is associated with a source and a group for a multicast, wherein the first domain comprises a Bit Indexed Explicit Replication (BIER) domain, and wherein the first boundary node is bordering both the BIER domain and a second domain comprising a first Protocol Independent Multicast (PIM) domain;
   generating, by the first boundary node, an encapsulated message based on the message, wherein generating the encapsulated message further comprises including a metric representing a cost of reachability from the first boundary node to the source and a first proxy address of the first boundary node in the encapsulated message;
   forwarding, by the first boundary node, the encapsulated message through the first domain to at least one second boundary node bordering the first domain and a third domain;
   triggering, by the first boundary node, the at least one second boundary node to decapsulate the encapsulated message for forwarding out of the first domain; and
   triggering, by the first boundary node, the at least one second boundary node to store a record comprising the metric representing the cost of reachability of the first boundary node to the source, and the first proxy address on the at least one second boundary node from the encapsulated message, wherein each of the first boundary node and the at least one second boundary node store the cost of reachability from the first boundary node and the at least one second boundary node to the source, wherein the cost of reachability comprises a number of hops, a network delay, a number of domains, and a travel time from the each boundary nodes to the source.

2. The method of claim 1, wherein the at least one second boundary node is bordering the third domain comprising another PIM domain.

3. The method of claim 2, wherein the second domain and the third domain are the same domain.

4. The method of claim 2, wherein the second domain includes a plurality of subdomains passed by a path from the first boundary node to the source, and the cost of the first boundary node is a summation of costs associated with segments of the path through the plurality of sub-domains to the source.

5. The method of claim 1, wherein the message is a PIM Flooding Mechanism (PFM) source active message comprising a PFM message originator address and a group source hold time.

6. The method of claim 5, wherein the encapsulated message includes a border proxy Type Length Value (TLV) representing the first proxy address.

7. The method of claim 6, wherein decapsulating the encapsulated message includes replacing the first proxy address of the first boundary node in the border proxy TLV with at least one second proxy address of the at least one second boundary node.

8. The method of claim 5, wherein the first boundary node is directly connected to the source.

9. The method of claim 8, wherein the encapsulated message does not include a border proxy TLV representing the first proxy address, and the first proxy address stored on the at least one second boundary node is NULL.

10. The method of claim 1, further comprising triggering the at least one second boundary node to store at least one group source hold time obtained from the message.

11. The method of claim 10, further comprising:
   generating a second encapsulated message based on a second message received by the first boundary node from outside the first domain, wherein the second message is associated with the source and the group;
   forwarding the second encapsulated message through the first domain to the at least one second boundary node;
   triggering the at least one second boundary node to determine whether or not the at least one group source hold time has expired;
   triggering the at least one second boundary node to update the metric in accordance with a determination that the at least one group source hold time has not expired; and
   triggering the second boundary node to remove the record in accordance with a determination that the group source hold time has expired.

12. A method comprising:
   receiving, at a first boundary node bordering a first domain, a message associated with at least one source and a group for a multicast, wherein the first domain is a Bit Indexed Explicit Replication (BIER) domain, and wherein the first boundary node is bordering both the BIER domain and a second domain comprising a Protocol Independent Multicast (PIM) domain;
   selecting, by the first boundary node, at least one second boundary node from one or more boundary nodes bordering the first domain, wherein based on stored records including sources, groups, metrics, and proxy addresses, a respective second boundary node of the at least one second boundary node has a best path among the one or more boundary nodes to the at least one source for the group, wherein a respective metric of the metrics stored on the first boundary node in a respective stored record of the stored records represents a respective cost of a respective boundary node to a respective source of a respective group, and wherein the respective cost of the respective boundary node to the respective source comprises a number of hops, a network delay, a number of domains, and a travel time from the each boundary nodes to the respective source;
   obtaining, by the first boundary node, at least one proxy address corresponding to the at least one second boundary node; and
   forwarding, by the first boundary node, the message through the first domain to the at least one second boundary node according to the at least one proxy address.

13. The method of claim 12, wherein the message is an Internet Group Management Protocol (IGMP) join message.

14. The method of claim 13, wherein the message is associated with any-source multicast (ASM).

15. The method of claim 12, wherein the first boundary node maintains the stored records in response to receiving PFM messages and the first boundary node also maintains a PFM cache storing information derived from the PFM messages.

16. The method of claim 12, wherein the message is a PIM join message.

17. The method of claim 16, wherein selecting the at least one second boundary node from the one or more boundary nodes bordering the first domain, includes for a source of the at least one source:
  determining whether or not in the stored records, a proxy address associated with the source and the group is NULL;
  in accordance with a determination that no proxy address associated with the source and the group is NULL, comparing metrics in the stored records to select the at least one second boundary node; and in accordance with a determination that the proxy address associated with the source and the group is NULL, retrieving a PFM originator address associated with the source and the group from a PFM cache, and selecting a node corresponding to the PFM originator address as the at least one second boundary node.

18. A networking device comprising:
  one or more processors; and
  a non-transitory memory coupled to the one or more processors, wherein the one or more processors are configured to:
    receive a message from outside a first domain that the network device is bordering, wherein the message is associated with a source and a group for a multicast, wherein the first domain is a Bit Indexed Explicit Replication (BIER) domain, and wherein the first boundary node is bordering both the BIER domain and a second domain comprising a Protocol Independent Multicast (PIM) domain;
    generate an encapsulated message based on the message, wherein the one or more processors being operative to generate the encapsulated message further comprises the one or more processors being operative to include a metric representing a cost of reachability of the networking device to the source and a first proxy address of the networking device in the encapsulated message;
    forward the encapsulated message through the first domain to at least one second boundary node bordering the first domain and a third domain;
    trigger the at least one second boundary node to decapsulate the encapsulated message for forwarding out of the first domain; and
    triggering, by the first boundary node, the at least one second boundary node to store a record comprising the metric representing the cost of reachability of the networking device to the source and the first proxy address on the at least one second boundary node from the encapsulated message, wherein each of the first boundary node and the at least one second boundary node store the cost of reachability from the first boundary node and the at least one second boundary node to the source, wherein the cost of reachability comprises a number of hops, a network delay, a number of domains, and a travel time from the each boundary nodes to the source.

19. The networking device of claim 18, wherein the one or more processors are further configured to:
  trigger the at least one second boundary node to store at least one group source hold time obtained from the message;
  generate a second encapsulated message based on a second message received by the first boundary node from outside the first domain, wherein the second message is associated with the source and the group;
  forward the second encapsulated message through the first domain to the at least one second boundary node;
  trigger the at least one second boundary node to determine whether or not the at least one group source hold time has expired;
  trigger the at least one second boundary node to update the metric in accordance with a determination that the at least one group source hold time has not expired; and
  trigger the second boundary node to remove the record in accordance with a determination that the group source hold time has expired.

20. The network device of claim 18, wherein the third domain comprises another PIM domain.

\* \* \* \* \*